United States Patent [19]

Anzai et al.

[11] 3,906,620

[45] Sept. 23, 1975

[54] METHOD OF PRODUCING MULTI-LAYER STRUCTURE

[75] Inventors: Norio Anzai, Tokorozawa; Akihiro Tomozawa; Masayasu Tsunematsu, both of Kodaira; Yasushi Matsui, Tokyo, all of Japan

[73] Assignee: Hitachi, Ltd., Japan

[22] Filed: Oct. 29, 1973

[21] Appl. No.: 410,445

[30] Foreign Application Priority Data

Oct. 27, 1972 Japan .............................. 47-107222

[52] U.S. Cl. ....................... 29/571; 29/578; 29/580; 29/591

[51] Int. Cl.$^2$ .......................................... B01J 17/00

[58] Field of Search ............. 29/571, 578, 579, 580, 29/588, 591; 148/189

[56] References Cited

UNITED STATES PATENTS

| | | | |
|---|---|---|---|
| 3,244,555 | 4/1966 | Adam et al. | 29/580 X |
| 3,397,448 | 8/1968 | Tucker | 29/580 X |
| 3,549,437 | 12/1970 | Steppberger et al. | 29/579 X |
| 3,764,865 | 10/1973 | Napoli et al. | 29/578 X |
| 3,775,191 | 11/1973 | McQuhae | 29/571 X |
| 3,798,752 | 3/1974 | Fujimoto | 29/571 |

*Primary Examiner*—Roy Lake
*Assistant Examiner*—Craig R. Feinberg
*Attorney, Agent, or Firm*—Craig & Antonelli

[57] ABSTRACT

A method of producing metal-insulator-semiconductor structures, wherein an insulating layer is etched using a conductor layer formed on a selected area of the insulating layer as a mask, and a peripheral edge projection of the conductor layer caused by side etching of the side portion of the insulating layer during the etching step is completely converted into an insulator, whereby the destruction of the gate of the structure is prevented.

9 Claims, 12 Drawing Figures

METHOD OF PRODUCING MULTI-LAYER STRUCTURE

CROSS REFERENCE TO RELATED APPLICATION

This application is related to subject matter described in copending U.S. application Ser. No. 400,924, filed Sept. 26, 1973, entitled "METHOD OF PRODUCING MIS STRUCTURE" by Akira Nagase, Masayasu Tsunematsu, Norio Anzai and Akihiro Tomozawa and assigned to the same assignee as the present application.

BACKGROUND OF THE INVENTION

1. Field of the Invention

The present invention relates to a method of producing a multilayer structure having a substrate of a semiconductor. More particularly, the method is mainly directed to a silicon gate MOS-type semiconductor device.

2. Description of the Prior Art

In general, in a semiconductor device having an insulated gate, such as a MOS field-effect transistor (MOSFET), the $SiO_2$ (silicon dioxide) film constituting an insulating portion is very thin. For this reason, even only a very slight voltage, generated in the gate, is liable to cause dielectric breakdown of the gate. As the countermeasure against this, the gate may be protected in such way that a surface breakdown diode is arranged in parallel with the gate or that a series resistance is employed. In a silicon gate MOS field-effect transistor which uses polycrystalline silicon for the gate, a similar countermeasure against gate destruction has heretofore been taken. It has been revealed, however, that the gate is not satisfactorily protected by such method. In more detail, in the manufacture of the Si gate MOSFET, an $SiO_2$ film on source and drain regions is selectively etched using the Si gate as a mask. When forming the Si gate, as illustrated in FIG. *1a* a polycrystalline Si layer *4a* is first photoetched, and an underlying gate $SiO_2$ layer *3a* is subsequently etched. The gate $SiO_2$ layer *3a* therefore is side etched, with the result that the overlying polycrystalline Si layer *4a* projects in the form of a "pent roof" at the periphery of the gate $SiO_2$ layer. Beneath such a "pent roof" (shown at *4b* in the figure), it is difficult to sufficiently form an $SiO_2$ layer 8 by the CVD (chemical vapor deposition) process employed during the succeeding steps of manufacture. Foreign matter is also prone to be concentrated here. Furthermore, since the pent roof *4b* is acute at its front end, the electric field concentration is easily increased at this part, and it is easily broken by a slight external shock or the like. These drawbacks lead to the causes of short-circuits.

It has been revealed that, when the pent roof is formed in the Si gate, the dielectric breakdown is liable to occur at this part even for a low gate voltage due to the reasons stated above. As a result, the inventors subjected a number of completed Si gate MOSFETs to an experiment in which test pieces whose gate breakdown voltages were lower than a certain standard value were rejected by the voltage screening test. Where the test pieces were 200 bit shift registers, the percent defective was 4 to 5%. Such test requires a considerable amount of time and lowers the yield due to the test itself; moreover, it results in high cost. In view of these disadvantages, the present invention has been made as a method which eliminates the necessity for using such a test.

SUMMARY OF THE INVENTION

The objects of the present invention are (1) that the rate of destruction of gates is diminished in semiconductor devices having MOS construction, broadly MIS construction, (2) that since the voltage screening test shows that the proportion of defective semiconductor products of MIS construction is, for example, below 0.1% for 200 bit shift registers, the voltage screening test becomes unnecessary, (3) that a gate electrode as well as an interconnection layer made of polycrystalline silicon and an interconnection layer made of aluminum in a silicon gate MOSFET are prevented from being short-circuited to each other, and (4) that the conditions of oxidizing the "pent roof" of a silicon gate are varied in the silicon gate MOSFET, whereby the threshold voltage $V_{th}$ of the device is adjusted to a desired value.

The fundamental aspect of the present invention for accomplishing the above-mentioned objects consists in a method of producing a multi-layer structure having a construction in which a conductor layer is included over a semiconductor substrate with an insulating layer interposed therebetween and in which the insulating layer is etched using the partially formed conductor layer as a mask, characterized in that the surface of the conductor layer is converted into an insulator to such an extent that a peripheral edge projection (pent roof) of the conductor layer which arises from side etching of the side portion of the insulating layer at the aforesaid etching step is completely converted into the insulator.

Another aspect of the present invention consists in a method of producing a multi-layer structure in which a polycrystalline Si layer is provided over an Si substrate with an $SiO_2$ layer interposed therebetween and for which, using the partially formed Si layer as a mask, the $SiO_2$ layer is etched to form an Si gate electrode, characterized in that the surface of the Si layer is oxidized to such extent that a peripheral edge projection of the Si layer which arises due to side etching of the side portion of the $SiO_2$ layer during the aforesaid etching step is completely converted into $SiO_2$, that an insulating layer is thereafter covered and formed externally, and that wiring layers made of a metal are further formed on predetermined areas.

BRIEF DESCRIPTION OF THE DRAWINGS

FIGS. *1a* and *1b* illustrate the essential portions of the MOS construction for explaining the basic construction of the present invention, in which FIG. *1a* is a vertical sectional view of the portions in the case of manufacture by a prior-art method, while FIG. *1b* is a vertical sectional view of the portions in the case of manufacture by the method of the present invention;

FIGS. *2a* to *2g* are sectional views showing various steps of manufacture of an embodiment of the present invention; and FIGS. 3 to 5 are curve diagrams for explaining the effect of the present invention, in which FIG. 3 illustrates the relationship between $V_{th}$ and the oxidizing time, FIG. 4 illustrates the relationship between $V_{th}$ and the thickness of an oxide film, and FIG. 5 illustrates the relationship between the reduction of $V_{th}$ and the oxidizing time.

PREFERRED EMBODIMENTS OF THE INVENTION

Figure 1A:
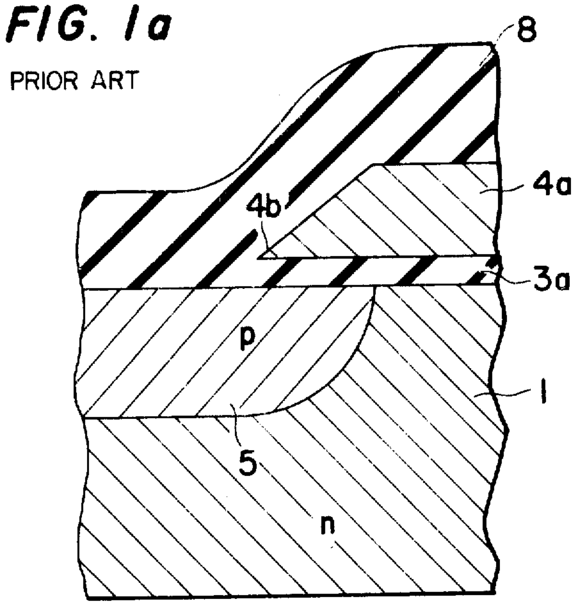
FIG. 1a PRIOR ART

The present invention will be concretely described hereunder along the preferred embodiments.

Figure 1B:
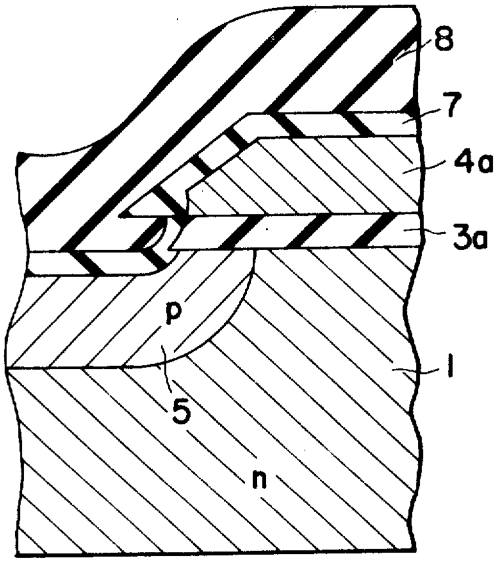
Figure 2A:
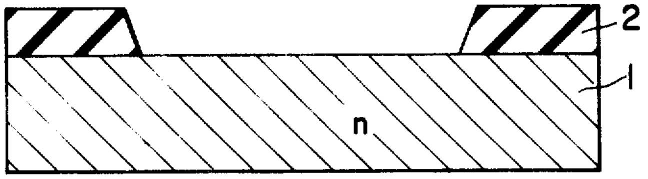
Figure 2B:
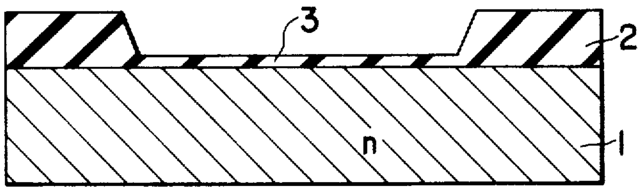
Figure 2C:
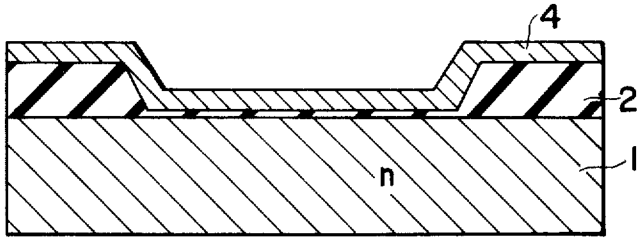
Figure 2D:
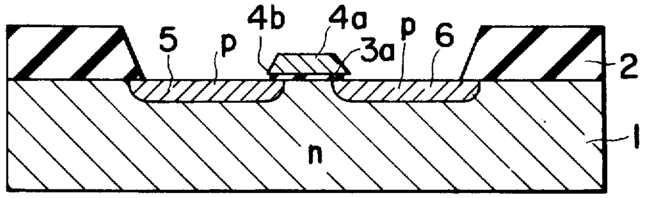
Figure 2E:
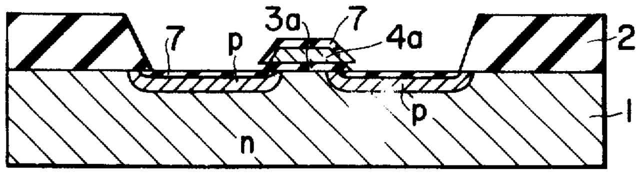
Figure 2F:
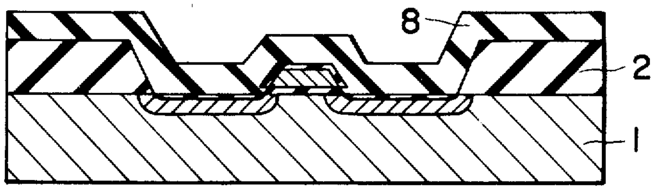
Figure 2G:
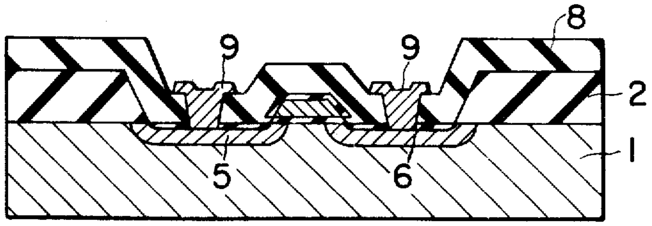

FIGS. 2*a* to 2*g* show manufacturing steps in the case where the present invention is applied to a P-channel Si gate MOSFET. The various producing steps (*a*) to (*g*) are as follows:

a. An n-type silicon substrate 1 having a specific resistance of about 5 – 8 ωcm is prepared. It is heated in an oxidizing atmosphere at approximately 1,200°C., thereby to form a first thermal oxidation film 2 in the surface of the substrate to a thickness of about 14,000 A. Subsequently, that part of the thermal oxidation film 2 which corresponds to the source, drain and gate regions to be formed is removed by photoetching techniques.

b. Oxidation is again carried out in the oxidizing atmosphere at approximately 1,200°C., to form a second thermal oxidation film 3 having a thickness about 1,250 – 1,300 A on the substrate surface exposed by the step (a). The second thermal oxidation film is used as a gate insulating film. In consideration of the fact that the threshold voltage $V_{th}$ is lowered by the third thermal oxidation at a step (e) to be explained below, the thickness of the second thermal oxidation film is corrected so as to be larger by 250 – 300 A than in the usual case. Such larger thickness, however, is not always necessary. In case it is desired to suitably lower the threshold voltage $V_{th}$, the thickness of the oxide film, the oxidizing atmosphere, the oxidation temperature and/or the oxidation time may be approximately varied.

c. Using the CVD process, Si produced by thermally decomposing $SiH_4$ (monosilane) at about 600°C. is deposited on the entire surface of the resultant substrate to a thickness of approximately 5,000°A. Thus, a polycrystalline Si layer 4 is formed.

d. The polycrystalline Si layer 4 and the second thermal oxidation film 3 are selectively removed by photoetching, to provide windows for source and drain regions. Boron, for example, is subsequently diffused as an acceptor, to thereby form source region 5 and drain region 6 which are p-type diffused layers (about 8,000 A thick). During this step, an Si gate electrode 4*a* made from the polycrystalline Si layer is formed. In this respect, a "pent roof" 4*b* is formed at the peripheral edge part of the Si gate electrode due to side etching during the etching of the second thermal oxidation film 3.

e. thermal oxidation of the surface of the Si gate (the third thermal oxidation) is carried out in an oxidizing atmosphere at approximately 940°C. Here, the thermal oxidation is effected so that, as illustrated in FIG. 1*b*, the resulting thermal oxidation film 7 may extend inside the Si gate electrode 4*a* or the thermally-oxidized gate film 7 over the gate film 3*a*, in other words, to the extent that the pent roof 4*a* is perfectly oxidized. Since, as stated above, oxidation is carried out at the comparatively low temperature of 940°C., the oxidizing treatment hardly gives rise to re-diffusion of the source region 5 and the drain region 6, so that it is merely the threshold voltage $V_{th}$ which is slightly lowered. As explained previously, the lowering of $V_{th}$ is corrected beforehand by the thickness of the gate oxide film. The oxide films 7 are also formed in the surfaces of the source and drain by the third thermal oxidation treatment.

f. Using the CVD process, $SiO_2$ produced by the low temperature oxidation of $SiH_4$ at about 450°C. is deposited over the entire surface. Thus, a CVD oxide film 8 being approximately 8,000°A thick is formed.

g. Using photoetching techniques, the CVD oxide film 8 is formed therein with contact holes for the source region 5, drain region 6 and the gate (the contact hole for the gate is not shown). Aluminum is evaporated on the entire surface, and wiring layers 9 of a predetermined pattern are formed by photoetching.

In accordance with the construction of the present invention as described above, the objects can be achieved and the effects are produced as will be stated hereunder.

1. The pent roof 4*b* of the polycrystalline Si layer is perfectly oxidized during step (e). Therefore, even where the material $SiO_2$ of the oxide film 8 by the CVD process is produced in an imperfect state under the pent roof, or where imperfections concentrate on that part, the gate voltage is never applied directly to a pent roof. Consequently, the gate portion does not become a cause of dielectric breakdown. Moreover, the front end of the "pent roof" of the gate portion (electrically conductive part) does not have an acute-angle, so that concentration of the electric field does not readily occur. Even if the "pent roof" part is broken due to an external force, dielectric breakdown is prevented due to the presence of the oxide film.

2. For the reasons discussed in item (1), gate destruction decreases, and the defective percent measured by the voltage screening process becomes below 0.1%. As a consequence, the necessity for effecting the voltage screening process is eliminated, and this process can be omitted.

3. The polycrystalline Si layer of the gate electrode becomes surrounded by the thermal oxidation films of fine structure. Therefore, when compared with the construction, as in the prior art, in which only the comparatively porous $SiO_2$ produced by the CVD process exists around the polycrystalline Si, the construction of the present invention remarkably reduces the generation of short-circuits between a polycrystalline Si wiring (namely, an Si wiring continuous to the gate) and the A1 wiring formed over the gate through the CVD oxide film 8.

Figure 3:
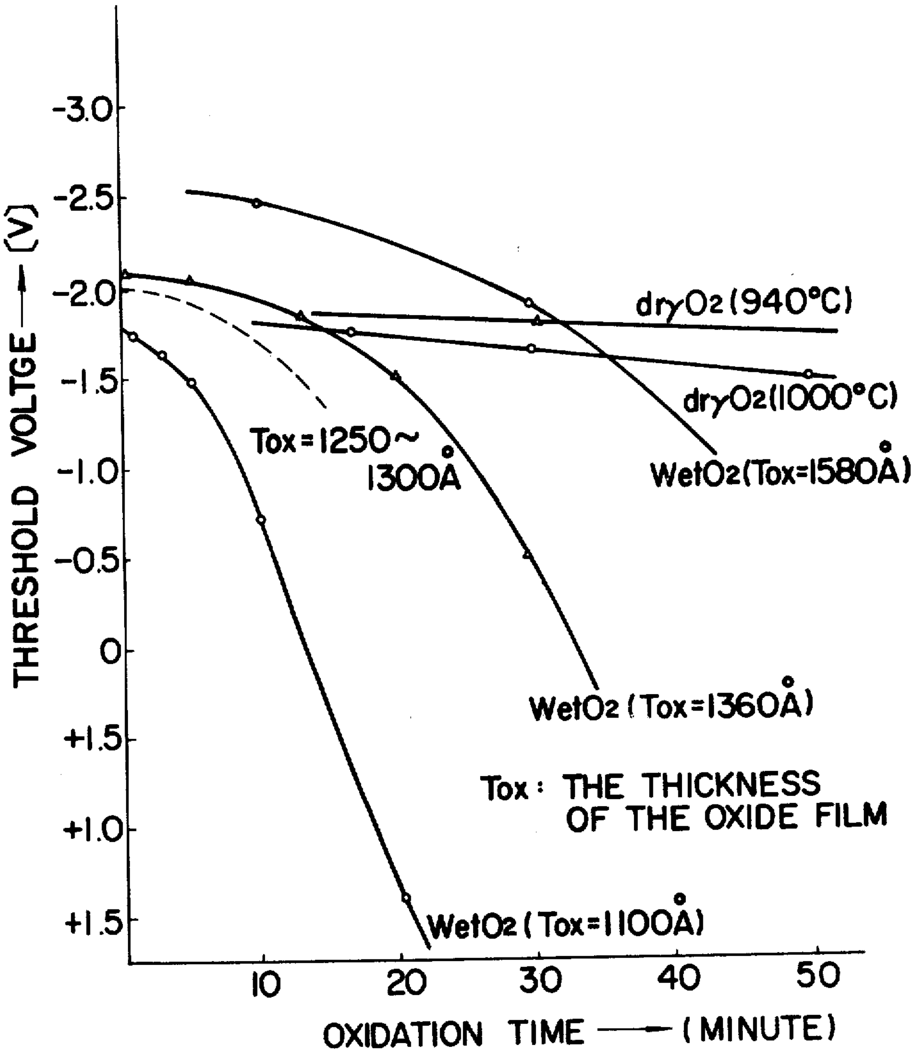
Figure 4:
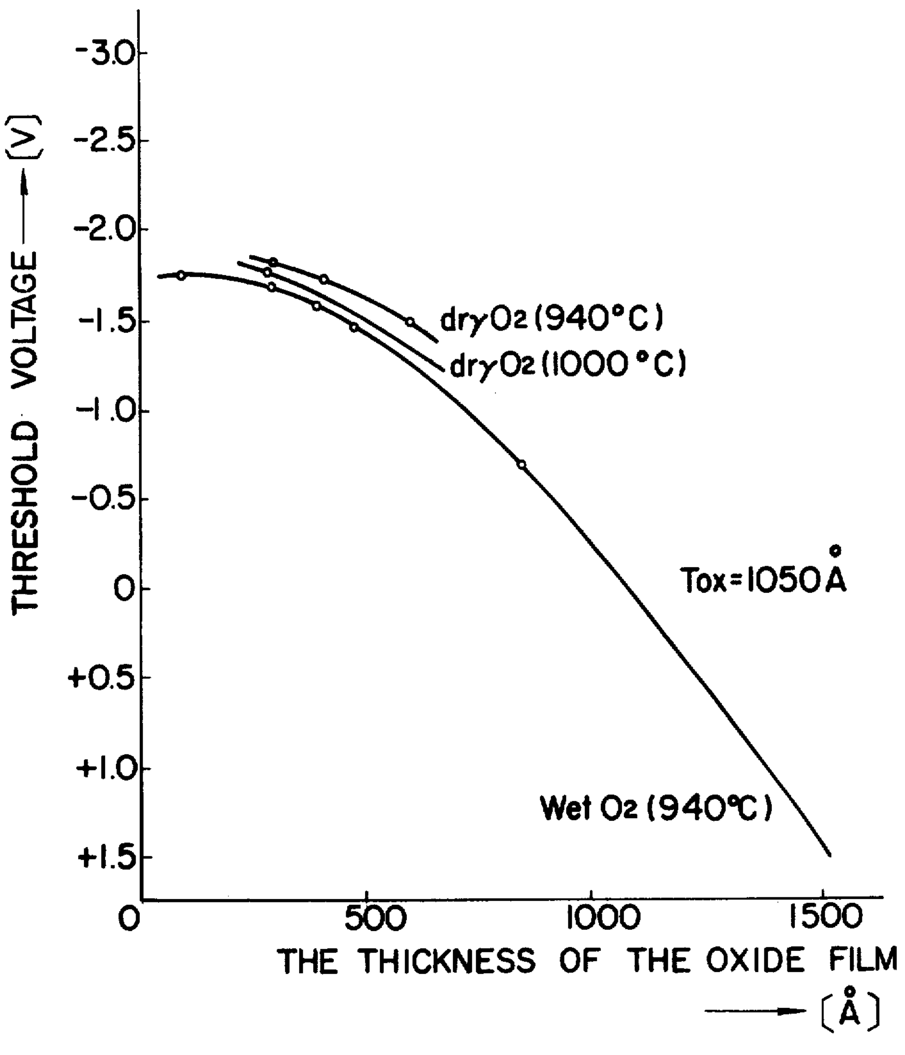
Figure 5:
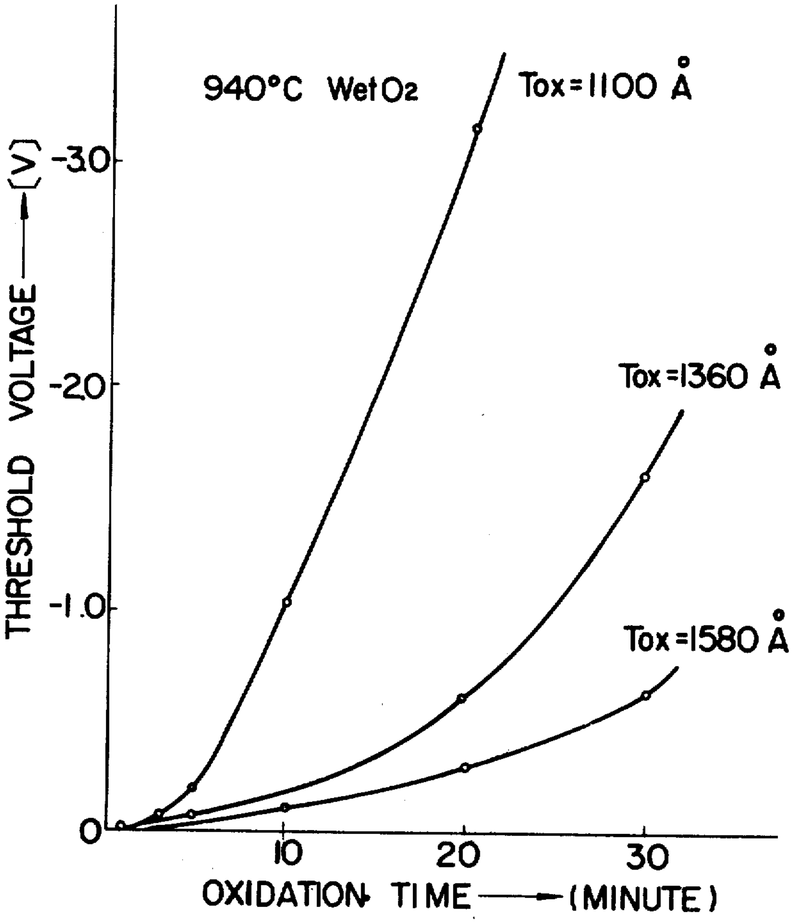

4. As illustrated in FIGS. 3 to 5, it is apparent that, as the depth of the surface oxidation of the pent roof portion of the polycrystalline Si layer of the gate electrode is larger, the threshold voltage $V_{th}$ becomes lower. The changes in $V_{th}$ differ in dependence on the oxidation time, the thickness of the gate oxide film (especially, the secondary oxide film), the state of the atmosphere or the oxidation temperature. $V_{th}$ can be controlled to a desired value by appropriately combining and controlling the conditions. As known from curves in FIGS. 3 to 5, a P-channel MOS structure of the depletion mode with a desired characteristic can be produced by setting the thickness of the oxide film or the oxidizing period of time at an appropriate value.

In addition to the foregoing embodiment, the present invention has the aspects of performance as mentioned below.

1. For the gate electrode, there may be employed another substance adapted to be converted into an insulator by being oxidized, such as molybdenum and tungsten.

2. For the gate insulating portion, silicon nitride ($Si_3N_4$) or a multi-layer film of, for example, a lamination of $SiO_2$ and $Si_3N_4$ may be used in place of $SiO_2$.

3. The MOS construction is other than that of the MOSFET.

The present invention is applicable to any semiconductor device having an insulated gate, the manufacture of a device including the step of etching an insulating portion by employing a conductor portion as a mask. That is, it is applicable to all sorts of MOS structures of the self-alignment construction, for example, to Si gate MOSFETs, Al MOSFETs and MOS ICs including them as constituent elements.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A method of manufacturing a semiconductor device comprising the steps of:

a. forming an insulator layer on a semiconductor substrate of a first conductivity type;

b. selectively forming a conductor layer on a part of said insulating layer; and c. etching parts of said insulating layer on which said conductor layer is not formed and parts of said insulating layer underlying the peripheral edge portions of said conductor layer so that the latter portions project beyond the side portions of said insulator layer therebeneath; and d. introducing impurities, of a second conductivity type opposite said first conductivity type into said substrate on opposite sides of the conductor layer-insulating layer structure to form semiconductor regions of said second conductivity type in said substrate; and then e. converting at least said projecting portions of said conductor layer into an insulator so that said peripheral edge portions of said conductor layer are completely converted into insulators.

2. The method according to claim 1, wherein said substrate is a silicon substrate, said insulating layer is silicon dioxide, said conductor layer is polycrystalline silicon and said step (e) comprises the step of oxidizing the surface of said polycrystalline layer to such an extent that the peripheral edge portion thereof is completely converted into silicon dioxide.

3. The method according to claim 2, further including the steps of (f) forming a further insulating layer covering the structure resulting from step (e); and g. selectively providing wiring contact layers through said further insulating layer at preselected portions thereof.

4. The method according to claim 1, further including the steps of (f) forming a further insulating layer covering the structure resulting from step (e); and g. selectively providing wiring electrode layers through said further insulating layer at predetermined portions thereof to contact said conductor layer and said semiconductor regions.

5. The method according to claim 1, wherein said conductor layer is made of a material selected from the group consisting of polycrystalline silicon, molybdenum and tungsten.

6. The method according to claim 1, wherein said insulating layer is made of a material selected from the group consisting of silicon dioxide, silicon nitride, and a multi-layer laminated film of silicon dioxide and silicon nitride.

7. The method according to claim 2, wherein said oxidizing step (e) is carried out at a temperature of about 940°C.

8. The method according to claim 1, wherein said substrate is a silicon substrate, said insulating layer is silicon dioxide, said conductor layer is polycrystalline silicon and said step (e) comprises the step of oxidizing the surface of said polycrystalline layer to such an extent that the peripheral edge portion thereof is completely converted into silicon dioxide.

9. The method according to claim 8, further including the steps of (f) forming a further insulating layer covering the structure resulting from step (e); and g. selectively providing wiring electrode layers through said further insulating layer at predetermined portions thereof to contact said conductor layer and said semiconductor regions.

* * * * *